Aug. 14, 1951 — R. KRASBERG — 2,563,940
COMBINATION BLADE AND WIPER HOLDER
Filed April 6, 1946
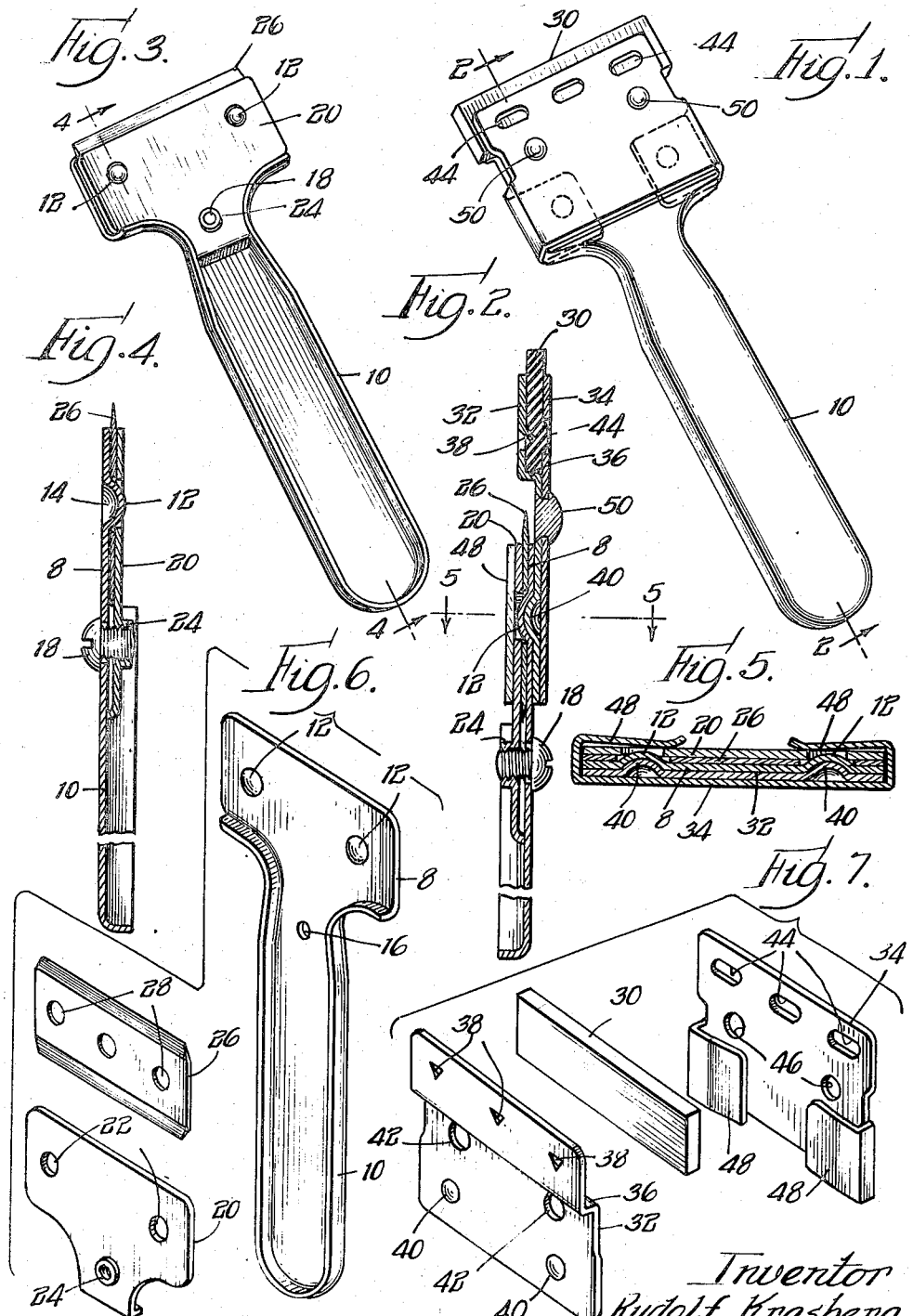
Inventor
Rudolf Krasberg
By:- Moore, Olson & Trexler
attys.

Patented Aug. 14, 1951

2,563,940

UNITED STATES PATENT OFFICE 2,563,940

COMBINATION BLADE AND WIPER HOLDER

Rudolf Krasberg, Chicago, Ill.

Application April 6, 1946, Serial No. 660,200

4 Claims. (Cl. 15—105)

This invention relates to glass cleaners, and more particularly to a combined scraper and wiper for cleaning glass and other hard, smooth surfaces.

In the cleaning of glass for the removal of spots of paint, decalcomania transfers, pasted labels, and the like, resort is frequently had to a scraper comprising a metal blade having a sharp edge. After glass surfaces are washed, one of the more convenient methods of removing the moisture and simultaneously cleaning the glass surface is to use a wiper comprising a strip of rubber or similar elastic material. Heretofore scrapers and wipers have been separate instruments.

One object of this invention is to provide a novel glass cleaner comprising a combined scraper.

Another object of this invention is to provide a combined scraper and wiper in which the wiper normally protects the scraper edge and which is readily removable to expose the scraper.

A further object of this invention is to provide an improved combined scraper and wiper providing a handy assembly of sturdy, simple, and improved construction.

Other and further objects of this invention will appear from the following description.

In the accompanying drawings, which form part of the instant specification and which are to be read in conjunction therewith, and in which like reference numerals are used to indicate like parts in the various views:

Fig. 1 is a perspective view showing the improved scraper and wiper with the parts in position to be used as a wiper;

Fig. 2 is a sectional view taken on the line 2—2 of Fig. 1;

Fig. 3 is a perspective view of the scraper and wiper shown in Fig. 1 with the parts in position to be used as a scraper;

Fig. 4 is a sectional view taken on the line 4—4 of Fig. 3;

Fig. 5 is a sectional view taken on the line 5—5 of Fig. 2;

Fig. 6 is an exploded view showing the scraper assembly; and

Fig. 7 is an exploded view showing the wiper assembly adapted to be used in combination with the scraper assembly.

In general this invention contemplates the provision of a handle member provided with suitable means for removably holding in a firm manner a scraper blade of any desired construction. A wiper assembly is provided co-acting with the handle and scraper holding means in such a manner as to provide a wiper. When in wiping position the scraper blade is protected and a user is likewise protected from injury by the scraper blade.

More particularly, referring now to the drawings, a support member 8 is provided with a handle 10 of any suitable construction. As shown in the drawings, the support plate 8 is formed integral with the handle member 10. The material of the plate 8 is deformed at spaced points to provide a pair of projections 12 on one side of the plate and a pair of re-entrant portions 14 on the other side of the supporting plate. On the plate or on the handle portion 10, in any suitable location, there is provided an opening 16 through which a clamping screw 18 is adapted to pass. Co-acting with the support plate 8 there is provided a clamping plate 20 formed with openings 22 adapted to receive the projections 12 formed on the support plate 8. The lower portion of the clamping plate 20 is formed with an internally threaded boss 24 positioned for registration with the opening 16 and adapted to receive the threaded portion of the clamping screw 18. The scraper blade 26 may be of any suitable construction and is formed with openings 28 adapted to register with the projections 12 on the support plate 8. The assembly is quite simple. The scraper blade 26 is placed upon the support plate 8 with its openings 28 registering with projections 12. The clamping plate 20 is then placed over the blade 26 with its openings 22 in registration with the projections 12. The screw 18 is then tightened to clamp the blade 26 between the support plate 8 and the clamping plate 20, as can readily be seen by reference to Fig. 4.

The wiper assembly comprises a wiper element 30 clamped between a pair of plates 32 and 34. The plate 32 has its upper portion bent to form a seat flange 36. The metal of the plate 32 adjacent the wiper 30 is provided with a plurality of punched teeth 38 adapted to grip the resilient material of the wiper strip 30. The lower portion of the metal of plate 32 is formed with projections 40 adapted to register with the reentrant portions 14 on the support plate 8, as will be hereinafter more fully pointed out. A pair of openings 42 are formed in the plate 32. The plate 34 is formed with openings 44 registering with the teeth 38 which are adapted to permit the resilient material of the wiper strip 30 to flow thereinto when the parts are in assembled position. The plate 34 is formed with a pair of openings 46 registering with the openings 42 and adapted to house rivets for holding the wiper assembly. The lower portion of plate 34 is provided with a pair of inwardly directed spring clip portions 48. In assembling the wiping element, the wiper strip 30 is clamped between plates 32 and 34 and maintained in clamped position by a headed stud member adapted to be passed through apertures in the plates, such as a pair of rivets 50.

The wiper assembly is normally supported adjacent the scraper assembly as shown in Figs. 1 and 2. The projections 40 are adapted to house in the re-entrant portions 14. The spring portions 48 embrace the clamping plate 20 of the scraper assembly. When assembled, the under portion of the seat flange extends over the edge of the scraper blade 26, protecting it from injury and at the same time protecting a user.

It will be seen that the objects of the invention have been accomplished. There is provided an improved glass cleaning instrument comprising a combination scraper and wiper in which the scraper blade may be readily removed for sharpening or for replacement. The wiping arrangement is adapted to be supported by the scraper assembly and handle in such a manner as to protect the scraper blade. It is readily removable and at the same time the strength of the spring clips is such as to hold the wiper assembly firmly in position for use as a wiper. The construction is rugged, simple, and economical to manufacture.

Having thus described the invention, what is claimed is:

1. A combination blade and wiper holder, including in combination a support plate formed with a plurality of spaced deformed portions presenting re-entrant areas on one side of said support plate and projections on the other side of said support plate, an integral handle extending from said support plate, a clamping plate, a scraper formed with means registering with said projections positioned between said support plate and said clamping plate, means for holding said clamping plate to said support plate in clamping position, a wiper assembly having projections for registration with said re-entrant areas on said support plate, and readily releasable means for supporting said wiper assembly adjacent said support plate and said clamping plate with said projections of said wiper assembly seated in said re-entrant areas.

2. A combination blade and wiper holder as in claim 3 in which said wiper assembly comprises a pair of plates, a wiper strip, means for clamping said wiper strip between said plates, one of said plates carrying said wiper assembly projections and the other of said plates being formed with a pair of inwardly directly resilient wings, said wings comprising the readily releasable supporting means.

3. A combination blade and wiper holder as in claim 3 in which said wiper assembly comprises a pair of plates, a wiper strip, one of said plates being formed with an offset portion, said wiper strip being seated on said offset portion, means for securing said plates to each other with the wiper strip therebetween, said offset portion being adapted to overlie said scraper blade.

4. A combination blade and wiper holder as in claim 3 in which said wiper assembly comprises a pair of clamping plates, a wiper strip, means for securing said wiper assembly clamping plates to each other with the wiper strip clamped therebetween, one of said wiper assembly clamping plates being formed with a plurality of teeth, said teeth extending in the direction of said wiper strip, and the other of said wiper assembly clamping plates being formed with a plurality of openings registering with said teeth and adapted to receive portions of said wiper strip overlying said teeth.

RUDOLF KRASBERG.

REFERENCES CITED

The following references are of record in the file of this patent:

UNITED STATES PATENTS

| Number | Name | Date |
| --- | --- | --- |
| 217,081 | Epting | July 1, 1879 |
| 714,034 | Richter | Nov. 18, 1902 |
| 1,201,076 | Murray | Oct. 10, 1916 |
| 1,236,126 | Wightman | Aug. 7, 1917 |
| 1,500,274 | Scarling | July 8, 1924 |
| 1,526,384 | Simpson | Feb. 17, 1925 |
| 1,681,082 | Bamberger | Aug. 14, 1923 |
| 1,726,017 | Des Enfants | Aug. 27, 1929 |
| 2,042,706 | Dry | June 2, 1936 |
| 2,242,992 | Devor | May 20, 1941 |

FOREIGN PATENTS

| Number | Country | Date |
| --- | --- | --- |
| 552,699 | France | May 4, 1923 |

Certificate of Correction

Patent No. 2,563,940 August 14, 1951

RUDOLF KRASBERG

It is hereby certified that error appears in the printed specification of the above numbered patent requiring correction as follows:

Column 1, lines 39 and 40, strike out "and wiper" and insert the same after the syllable "er" and before the period in line 18, same column; column 4, lines 2, 11 and 19, for the claim reference numeral "3" read *1*; same column, line 7, for "directly" read *directed*;

and that the said Letters Patent should be read as corrected above, so that the same may conform to the record of the case in the Patent Office.

Signed and sealed this 22nd day of January, A. D. 1952.

[SEAL]

THOMAS F. MURPHY,
*Assistant Commissioner of Patents.*